United States Patent [19]

Hök et al.

[11] Patent Number: 4,649,271
[45] Date of Patent: Mar. 10, 1987

[54] FIBER-OPTIC ACCELERATION SENSOR WITH PHOTOLUMINESCENT MATERIAL

[75] Inventors: Bertil Hök; Lars Jonsson, both of Västerås, Sweden

[73] Assignee: ASEA Aktiebolag, Västerås, Sweden

[21] Appl. No.: 694,326

[22] Filed: Jan. 24, 1985

[30] Foreign Application Priority Data

Jan. 25, 1984 [SE] Sweden .................. 8400366

[51] Int. Cl.$^4$ ................................. H01J 5/16
[52] U.S. Cl. ........................... 250/227; 250/231 R; 73/517 R; 350/96.34; 350/96.1
[58] Field of Search ............... 250/200, 215, 216, 221, 250/222.1, 227, 229, 230, 483.1, 231 R; 350/413, 96.1, 96.34; 73/488, 499, 514, 653, 517 R

[56] References Cited
U.S. PATENT DOCUMENTS 4,268,112  5/1981  Peterson .................. 350/413 X
4,353,259 10/1982  Schneider, Jr. .............. 73/499 X
4,569,570  2/1986  Brogardh et al. ............ 350/96.34
4,592,664  6/1986  Bislenga et al. ............ 250/227 X Primary Examiner—Eugene R. LaRoche
Assistant Examiner—David Mis
Attorney, Agent, or Firm—Watson, Cole, Grindle & Watson

[57] ABSTRACT

A fiber-optic sensor for sensing dynamic acceleration is arranged so that the acceleration gives rise to changes in angle between at least one body and the optical axis of at least one lens of graded index type (GRIN lens). At least one optical fiber is arranged to transmit optical energy to and from one end surface of the lens. The optical energy reflected back into the fiber is dependent on the angle and essentially independent of the distance between the body and the lens, and the sensor comprises at least one photoluminescent material so that a part of the optical output signal from the sensor includes a photoluminescent signal.

21 Claims, 5 Drawing Figures

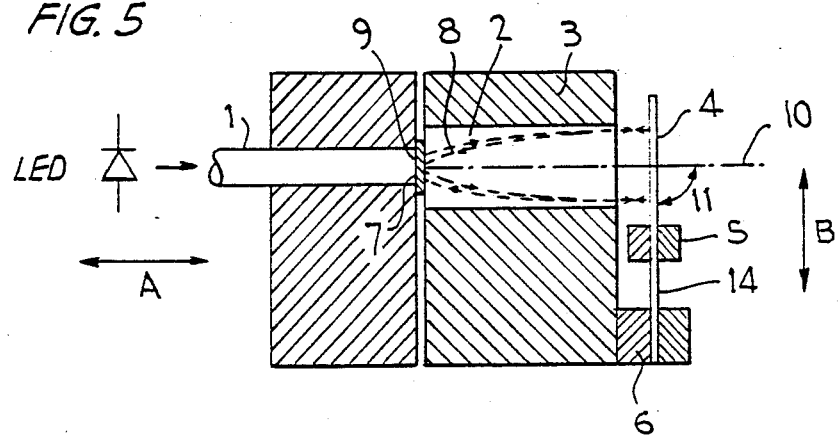

FIBER-OPTIC ACCELERATION SENSOR WITH PHOTOLUMINESCENT MATERIAL

BACKGROUND OF THE INVENTION

This invention relates to a fiber-optic sensor for sensing dynamic acceleration which is arranged so that the acceleration gives rise to changes in the angle between at least one body and the optical axis of at least one lens or graded index type (a GRIN lens), at least one optical fiber being arranged to transmit optical energy to the sensor. The GRIN lens is utilized for amplifying the modulation of the optical signal.

The sensor is intended to be employed in a fiber-optic system such as the system described in U.S. Pat. No. 4,581,528 which is assigned to the assignee of this application. The device described herein constitutes an improvement in the sensor for acceleration sensing described in the noted patent.

SUMMARY OF THE INVENTION

A sensor according to the invention is characterized in that the optical energy reflected back into the fiber is arranged to be dependent on the angle and essentially independent of the distance between the body and the lens, and in that the sensor comprises at least one photoluminescent material arranged so that a photoluminescent signal constitutes a part of the optical output from the sensor. The improvement represented by this invention makes it possible to obtain a higher signal/noise ratio and a resultant improvement in accuracy of measurement. By utilizing a reflex signal from the movable body in combination with a control circuit, controlled by the photoluminescence, signal, a high signal level is obtained while at the same time the sensing system can be made insensitive to losses and reflections at fiber joints and branches in the optical system.

BRIEF DESCRIPTION OF THE DRAWING

The invention will now be described in greater detail, by way of example, with reference to the accompanying drawing, wherein FIG. 5 shows a fourth embodiment of the inventive sensor.

DESCRIPTION OF THE PREFERRED EMBODIMENTS

Figure 1:
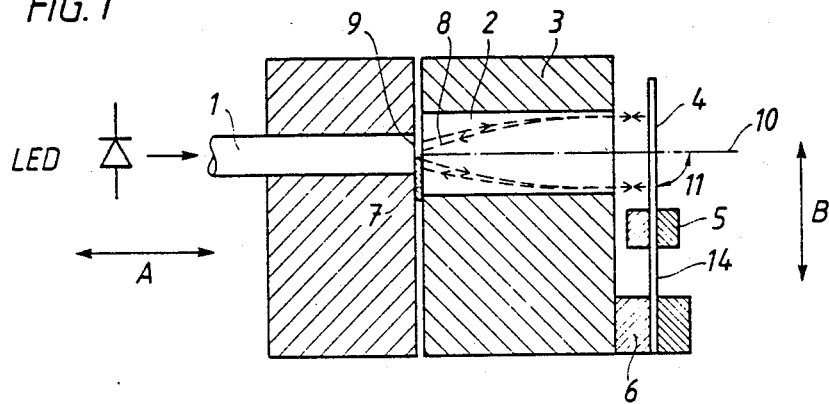
FIG. 1 is a sectional side elevation of a first embodiment of the inventive sensor.
Figure 2:
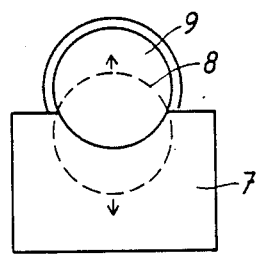
FIG. 2 is an end view of the optical fiber of the device of FIG. 1 with the projected image shown thereon.

FIGS. 1 and 2 show how optical energy from a light emitting diode (LED) is supplied to a the inventive sensor via an optical fiber 1. The bundle of rays diverging from the end 9 of the fiber 1 is collimated in a lens 2 of GRaded Index type (a GRIN lens). The parallel ray bundle leaving lens 2 strikes a reflecting beam element 4, after which the optical energy is focussed back towards the end 9 of the fiber 1. However, the sensor is adjusted so that approximately only one half of the image 8 of the fiber end is reflected back to strike the fiber end 9 as can clearly be seen in FIG. 2. The remaining amount of the reflected optical energy strikes a mass 7 of photoluminescent material and gives rise to photoluminescence. When an acceleration in the direction of one of the arrows A is applied to the sensor, the beam element 4 will flex and the angle 11 between the beam element 4 and the axis 10 of the lens 2 will change, causing a shift in the image 8 so that a different amount of reflected optical energy will be returned through the fiber 1. The photoluminescence which is generated in the mass 7 is also reflected by the beam element 4 and is thus returned via the fiber 1.

Both the reflux signal and the photoluminescence signal are then processed by means of a system described, for example, in the above-noted U.S. patent. A body 5 is carried by the beam element 4 and provides a measure of mechanical signal amplification. The body 5 should be located symmetrically around the beam element 4 so that the sensor is insensitive to accelerations in the longitudinal direction of the beam (i.e., in the directions of the arrows B.

The mass 7 of photoluminescent material can be formed as epitaxial layers in a semiconductor material, for example $Al_xGa_{1-x}As$. The beam element 4 can also be made from a photoluminescent material, for example $Al_xGa_{1-x}As$ and that would allow the mass 7 to be omitted.

Figure 3:
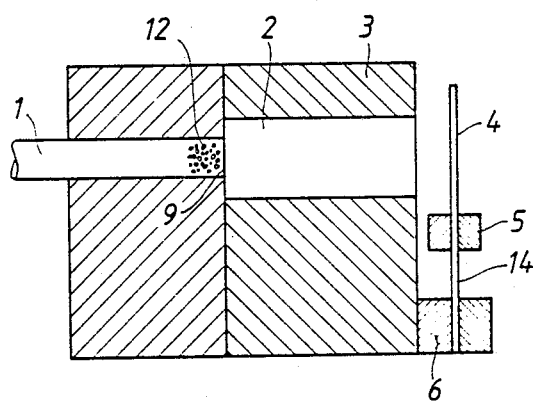
FIG. 3 shows a second embodiment of the inventive sensor using a different arrangement for achieving a photoluminescence signal, FIG. 4 shiows a third embodiment of the inventive sensor.

FIG. 3 shows a further embodiment of accelerometer for generating a photoluminescent signal. The photoluminescence in this case is obtained from ions 12 of rare earth metals, for example, neodymium. These ions can be inserted into a glassy material, for example in the end of the fiber 1 as shown in FIG. 3. The other numbered integers shown in FIG. 3 correspond to the same numbered integers in FIG. 1.

Figure 4:
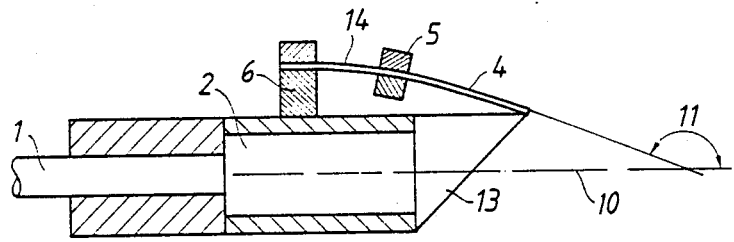

FIG. 4 shows a still further embodiment. This embodiment is capable of sensing acceleration perpendicular to the optical axis 10 of the GRIN lens 2. The ray path is here changed by means of a prism 13, which could be replaced by a mirror. The angle 11 shown on the righthand side of FIG. 4 to which the beam element 4 is deflected, represents a measure of the acceleration to which the sensor has been subjected.

The beam element 4 contains a resilient part and a body 5 mechanically connected to the element 4. The body 5 may be distributed equally on the left- and right-hand sides, respectively, of the element 4 (see FIGS. 3 and 4). As mentioned, the elment 4 may be made of a semiconductor material, and the photoluminescent material 7 may be made of a semiconductor material, such as $Al_xGa_{1-x}As$ or $In_xGa_{1-x}As_yP_{1-y}$.

The mass 7 of photoluminescent material can be placed against the end surface 9 of the fiber 1 and completely (see FIG. 5) or partially covers the end surface. The photoluminescent material 12 may consist of metal ions.

The embodiments described above may be varied in many ways within the scope of the appended claims.

What is claimed is:

1. A fiber-optic sensor for sensing dynamic acceleration and arranged so that the acceleration gives rise to changes in an optical output signal, which changes are caused by a change in an angle between at least one body and the optical axis of at least one graded index lens, at least one optical fiber being arranged to transmit optical energy to one end surface of the lens and to feed said optical output signal back from said end surface of the lens
wherein the energy of said optical output signal reflected back into the fiber is arranged to be dependent on the angle and essentially independent of the distance between the body and the lens, and the sensor includes at least one photoluminescent material arranged so that a photoluminescent signal constitutes a part of the optical output from the sensor.

2. Fiber-optic sensor according to claim 1, wherein said sensor is so arranged that the angle between said body and the optical axis of the lens will determine the transmission back into the fiber of the photoluminescent signal.

3. Fiber-optic sensor according to claim 1, wherein said sensor is so arranged that the angle between said body and the optical axis of the lens will influence the transmission of the reflected incident optical energy and the photoluminescent signal back into the fiber, the influence on said photoluminescent signal being adapted to be considerably smaller than the influence on the reflected incident optical energy.

4. Fiber-optic sensor according to claim 1, wherein said body is fixedly connected to the lens and comprises a resilient part permitting changes in said angle.

5. Fiber-optic sensor according to claim 4, wherein said body comprises a resilient part and a weight connected to said resilient part.

6. Fiber-optic sensor according to claim 5, wherein the weight is distributed equally on opposite sides, respectively, of the body.

7. Fiber-optic sensor according to claim 5, wherein said body is made of a semiconductor material.

8. Fiber-optic sensor according to claim 6, wherein said body is made of a semiconductor material.

9. Fiber-optic sensor according to claim 1, wherein said photoluminescent material is a semiconductor material.

10. Fiber-optic sensor according to claim 9, wherein said semiconductor material is one of $Al_xGa_{1-x}As$ and $In_xGa_{1-x}As_yP_{1-y}$.

11. Fiber-optic sensor according to claim 7, wherein said semiconductor material is in the form of epitaxial layers.

12. Fiber-optic sensor according to claim 8, wherein said semiconductor material is in the form of epitaxial layers.

13. Fiber-optic sensor according to claim 9, wherein said semiconductor material is in the form of epitaxial layers.

14. Fiber-optic sensor according to claim 10, wherein said semiconductor material is in the form of epitaxial layers.

15. Fiber-optic sensor according to claim 1, wherein said photoluminescent material is located against the end surface of the fiber and completely covers said end surface.

16. Fiber-optic sensor according to claim 1, wherein said photoluminescent material is located against the end surface of the fiber and partially covers said end surface.

17. Fiber-optic sensor according to claim 1, wherein said photoluminescent material consists of metal ions.

18. A fiber-optic sensor for sensing dynamic accelerations, said sensor comprising a support body which is subject to dynamic accelerations, said support body including a first body portion which has a first face and a second face and a bore which extends therethrough from said first face to said second face, and a second body portion which has a first face and a second face and a passageway which extends therethrough from said first face to said second face, said first face of said second body portion facing the second face of said first body portion and said passageway therein being aligned with said bore in said first body portion so as to define an optical axis of said support body, an optical fiber which extends through said bore in said first body portion to an end surface which is essentially flush with said second face of said first body portion, said optical fiber being capable of supplying optical energy into said support body and conveying an optical output signal away from said support body, a graded index lens positioned in said passageway of said second body portion, a flexible, reflecting beam element attached to said second body portion so as to flex relative to said second body portion and said optical axis when said support body is subject to dynamic accelerations, said beam element being capable of reflecting optical energy emitted from said graded index lens back into said graded index lens, the amount of said reflected optical energy being based on the angle at which said beam element is flexed relative to said optical axis, and photoluminescent means within said support body for generating a photoluminescent signal, said photoluminescent signal combining with said reflected optical energy to constitute said optical output signal.

19. A fiber-optic sensor as defined in claim 18, wherein said photoluminescent means comprises a photoluminescent plate which is positioned between said first and second body portions so as to at least partially cover said end surface of said optical fiber.

20. A fiber-optic sensor as defined in claim 18, wherein said photoluminescent means comprises photoluminescent particles within said optical fiber near the end surface thereof.

21. A fiber-optic sensor as defined in claim 18, including a weight element attached to said beam element.

* * * * *